United States Patent

Phoon

[19]

[11] Patent Number: 5,845,964
[45] Date of Patent: Dec. 8, 1998

[54] WRITING TABLET ASSEMBLY

[75] Inventor: Kin Yuen Phoon, Singapore, Singapore

[73] Assignee: JNE Holding Limited, Tortola, Virgin Islands (Br.)

[21] Appl. No.: 817,525

[22] PCT Filed: Aug. 29, 1995

[86] PCT No.: PCT/IB95/00706

§ 371 Date: Apr. 21, 1997

§ 102(e) Date: Apr. 21, 1997

[87] PCT Pub. No.: WO96/08985

PCT Pub. Date: Mar. 28, 1996

[30] Foreign Application Priority Data

Sep. 21, 1994 [GB] United Kingdom .................... 9418996

[51] Int. Cl.⁶ ..................................................... A47B 39/00
[52] U.S. Cl. ......................... 297/162; 297/171; 297/411.3
[58] Field of Search ...................................... 297/115, 145, 297/160, 162, 171, 173, 174, 411.3, 411.32

[56] References Cited

FOREIGN PATENT DOCUMENTS

| 56674 | 12/1974 | Australia | 297/162 |
|---|---|---|---|
| 816467 | 7/1969 | Canada | 297/162 |
| 599784 | 11/1959 | Italy | 297/162 |

*Primary Examiner*—Laurie K. Cranmer
*Attorney, Agent, or Firm*—Abelman, Frayne & Schwab

[57] ABSTRACT

A writing tablet assembly for attachment to a chair comprising: a writing tablet; a frame for supporting the writing tablet and for attachment to a chair, and a swivel joint interposed between the writing tablet and the frame to define a first predetermined plane of rotation of the swivel joint with respect to the frame and a second predetermined plane of rotation of the writing tablet with respect to the swivel joint.

12 Claims, 5 Drawing Sheets

WRITING TABLET ASSEMBLY

This invention relates to a writing tablet assembly and more particularly a writing tablet assembly including a writing tablet which is rotatable with respect to a frame for supporting the writing tablet.

Writing tablets are used in conjunction with a chair or the like to provide a surface which a person can write upon when seated on a chair. It is inconvenient to fix the writing tablet to a chair in a permanent position as this makes getting into and out of the chair difficult. Accordingly, writing tablets are generally hinged on a chair arm or the like and are moveable from an in use position into a stored position. The stored position is generally one in which the writing tablet has its writing surface oriented vertically.

The simplest form of known writing tablet assembly uses a writing tablet hinged on a chair arm for rotation from the writing position through 90° into a substantially vertical position. This configuration means that, when in the stored position, the writing tablet is highly obtrusive and is not, therefore, satisfactorily stored.

A more sophisticated known writing tablet assembly has a ball joint on a stem fixed to the writing tablet as its hinge. A ball socket is supported by the chair which receives the ball joint. This arrangement provides substantially universal movement of the writing tablet with respect to the chair but does not adequately control the movement of the writing tablet with respect to the chair such that the writing tablet may be rotated into a position in which people may not be able to pass along a row of chairs having such writing tablet assemblies as they could be blocked by the writing tablet.

FR-A-2 579 435 describes a writing tablet for attachment to a frame of a chair. A ball joint provides the means by which the writing tablet is hingeable with respect to the frame of the chair. The ball joint allows rotation of the writing tablet with respect to the frame of the chair about two orthogonal and substantially horizontal axis (X—X and Y—Y) to move the writing tablet from a vertical stored position through 180° about the X—X axis and then through 90° about the Y—Y axis into a writing position.

U.S. Pat. No. 4,216,994 describes a writing tablet assembly comprising a writing tablet fixed to a side arm of a chair. The end of the side arm of the chair is at 45° to the vertical. A pivot is provided on the end of the side arm and connected to a bracket on the writing tablet which is bent at 45° to the plane of the writing tablet. Rotation of the writing tablet through 180° about the pivot (axis A—A) moves the writing tablet from a stored vertical position to an in use horizontal position.

FR-A-2 167 714 describes a writing tablet having a pivot in the form of a post which projects from the writing tablet for insertion in a side arm of the chair. The side arm of the chair has a hole for receiving the post, the hole being angled forwardly and upwardly so that rotation of the post with respect to the hole moves the writing tablet from a stored vertical position into an in use horizontal position.

It is an object of the present invention to provide a writing tablet assembly which does not suffer from the above-mentioned disadvantages.

Accordingly, the present invention provides a writing tablet assembly for attachment to a chair comprising: a writing tablet movable between a stored position and an in use position, and vice versa; a frame for supporting the writing tablet and for attachment to a chair; and a swivel joint interposed between the writing tablet and the frame, the swivel joint having two planar surfaces disposed at 45° to one another, the frame abutting the swivel joint at the first surface which defines a first predetermined plane of rotation of the swivel joint with respect to the frame and the writing tablet abutting the swivel joint at the second surface which defines a second predetermined plane of rotation of the writing tablet with respect to the swivel joint, the writing tablet being rotatable with respect to the swivel joint through substantially 180°.

In order that the present invention may be more readily understood, an embodiment thereof will now be described, by way of example, with reference to the accompanying drawings, in which.

Figure 1:
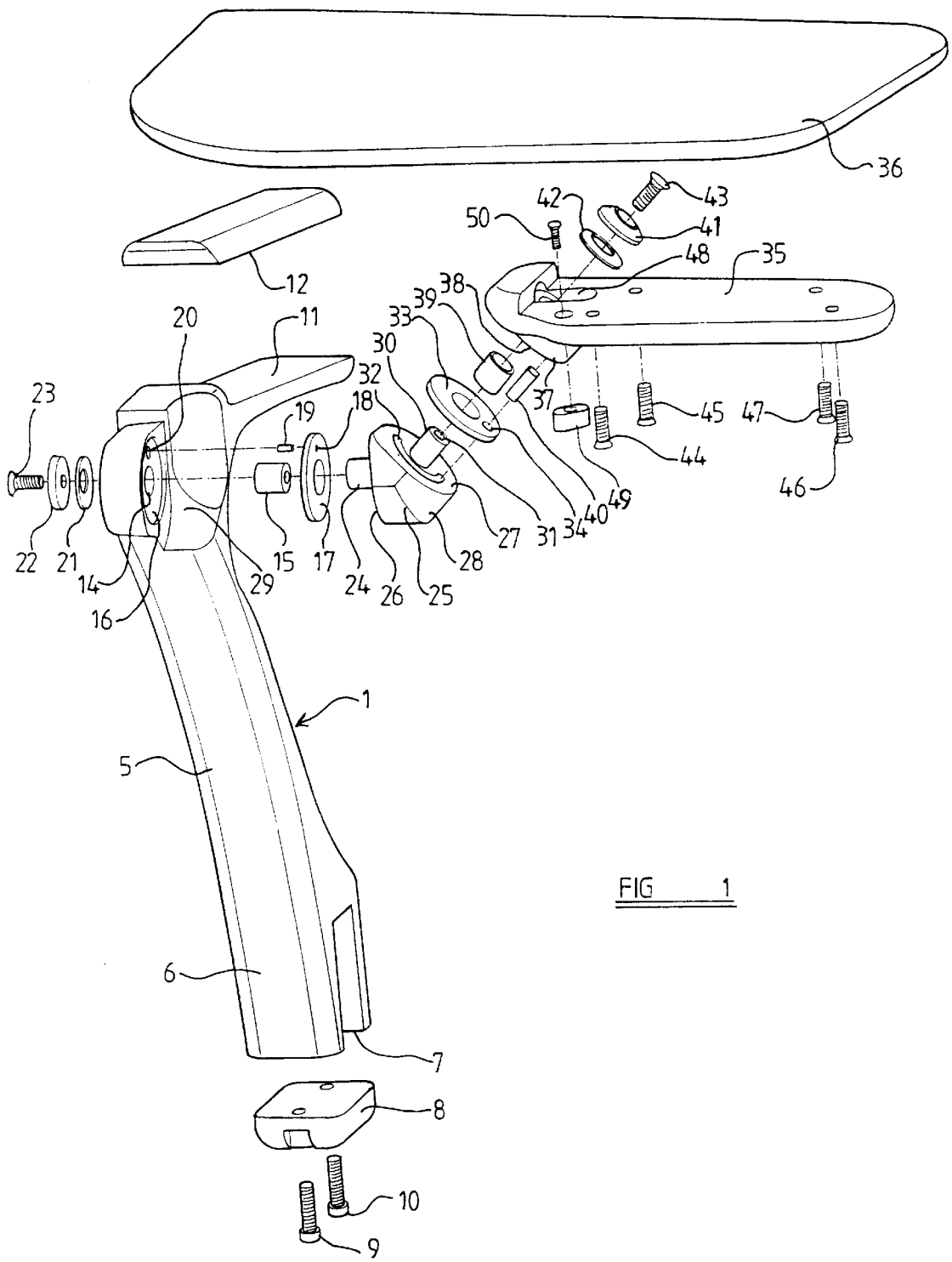
FIG. 1 is an exploded perspective view from above showing the constituent parts of a writing tablet assembly embodying the present invention.
Figure 2:
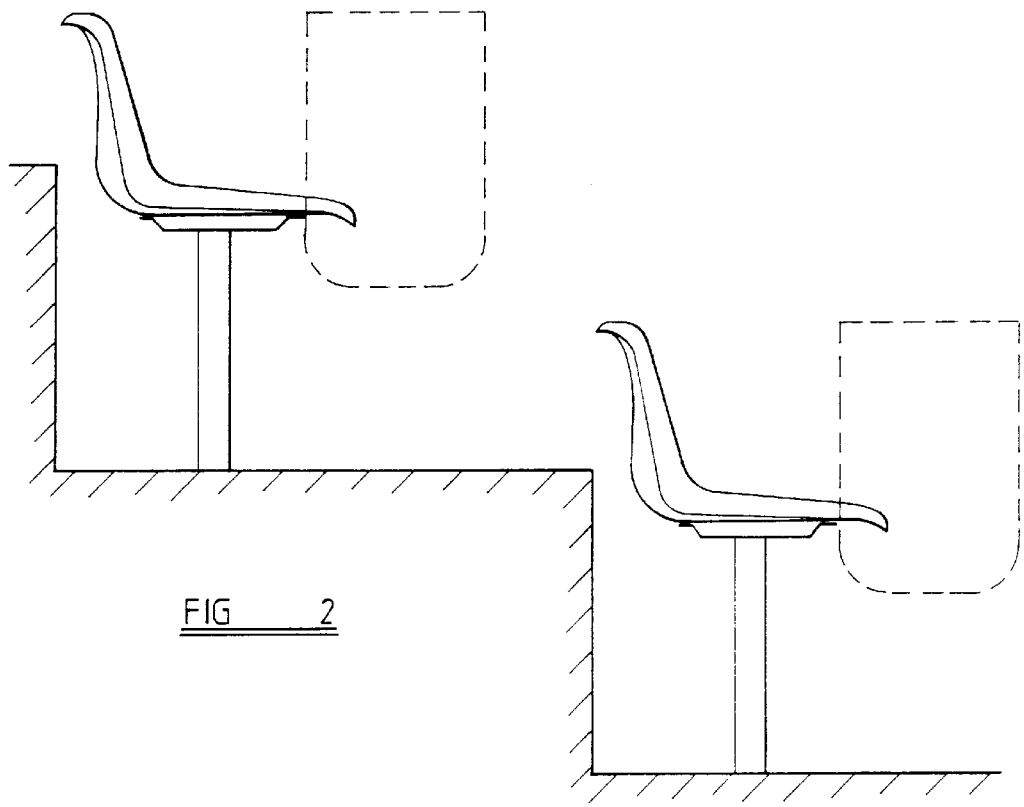
FIG. 2 is a side view of two tiers of chairs and the swing path of a known writing tablet.
Figure 3:
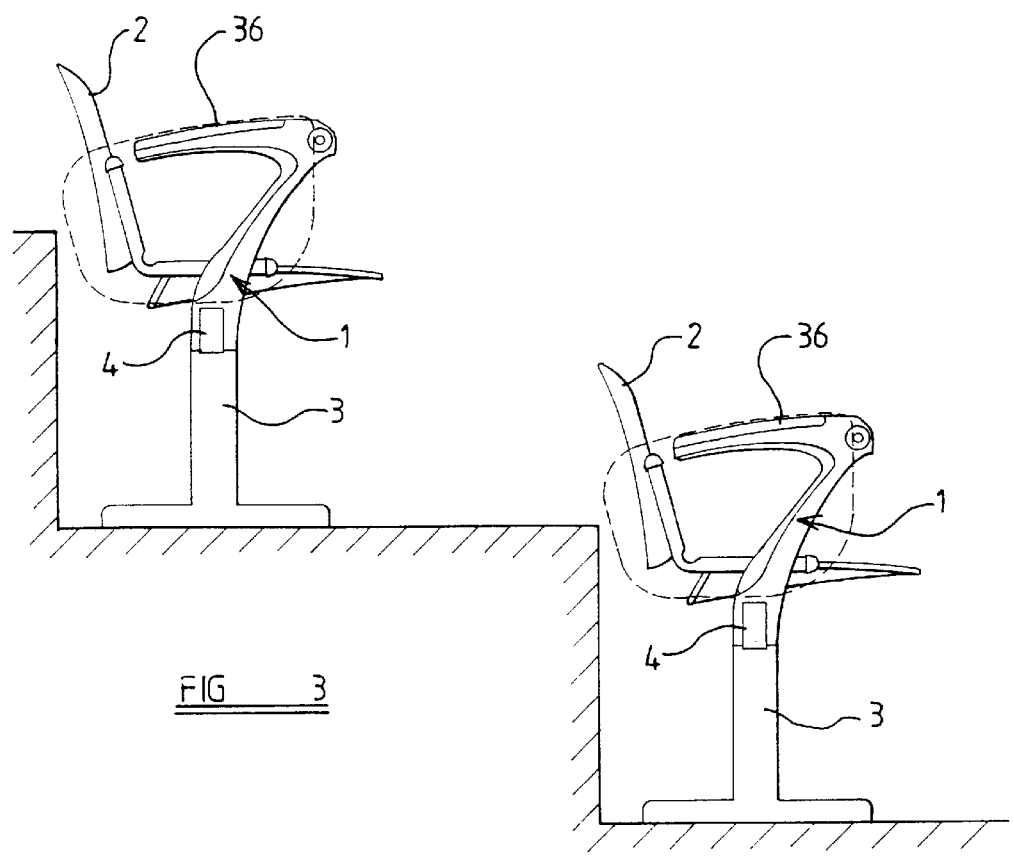
FIG. 3 is a side view of two tiers of chairs fitted with the writing tablet assembly of FIG. 1.

Referring to FIGS. 1 and 3 to 6 and in particular to FIG. 1, a writing tablet assembly embodying the present invention comprises a frame or support for attachment to a chair 2 (see FIG. 3) upon which the writing tablet assembly is to be fixed. The frame 1 may be attached to the chair 2 in any one of a number of ways. As can be seen from the example shown in FIG. 3, the chair 2 to which the writing tablet assembly is to be fixed is not provided with any arm rest of its own and so the writing tablet assembly is fixed to the base 3 of the chair 2 by a horizontal brace 4 projecting from the bottom of the seat of the chair. The exemplary brace 4 is rectangular in cross-section.

The frame 1 comprises an elongate tablet arm 5 manufactured as an aluminium die casting. A base portion 6 of the tablet arm 5 is thickened and is formed with a rectangular slot 7 to receive the brace 4 protruding from the base 3 of the seat of the chair 2 to which the writing tablet assembly is to be fixed. The brace 4 is received within the rectangular slot 7 and a tablet base end 8 is secured to the base portion of the tablet arm 5 to enclose the chair brace 4 thus securing the tablet arm 5 to the chair brace 4. The tablet base end 8 is secured to the tablet arm 5 by a pair of screws 9, 10.

In the present example the tablet arm 5 is fixed adjacent the right hand side of the chair 2. The tablet arm 5 projects upwardly and forwardly from the chair brace 4.

An arm rest 11 in the form of an aluminum die casting formed integrally with the tablet arm 5 projects rearwardly from the end of the tablet arm parallel with the right hand side of the chair. The arm rest 11 is substantially horizontal. An injection moulded rubber arm rest pad 12 is provided along the top surface of the arm rest 11.

The body of the tablet arm 5 in the angle defined between the arm rest 11 and the tablet arm 6 is provided with a through bore 14 in which a bearing bush 15 is inserted. The bore 14 is surrounded by a concentric circular depression surface 16 in which is located an annular thrust washer 17. The thrust washer 17 is drilled with a small hole 18 which receives one end of a pin 19, the other end of the pin 19 being sunk into a corresponding hole 20 in the circular depression surface 16 around the through bore 14. The pin 19 prevents the washer 17 from rotating with respect to the depression surface 16.

A hardened disk spring 21 and a further washer 22 are provided on the other side of the bore 14 and a countersunk screw 23 passes through the further washer 22, the disk spring 21 and the bearing bush 15 and engages in a tapped hole (not shown) in a cylindrical stub 24 protruding from a swivel joint 25.

The swivel joint 25 comprises a single block of steel casting having a first planar surface 26 which is substantially circular and a second planar surface 27 at 45° to the first planar surface 26. The first planar surface 26 is smooth but is formed substantially at its centre, with the cylindrical stub 24. The stub 24 sits in the bearing bush 15 in the through bore 14 in the tablet arm 5. The screw 23 engaged in the tapped hole in the cylindrical stub 24 of the swivel joint 25 mounts the swivel joint 25 for rotation with respect to the tablet arm 5.

The swivel joint 25, whilst having substantially circular planar surfaces 26, 27 is formed with two diametrically opposed lobes 28 which distort the otherwise circular appearance of the swivel joint.

The lobes 28 are provided on the swivel joint 25 to restrict the angular rotation of the swivel joint with respect to the tablet arm 5 and do so by abutting a stopper face 29 formed on the tablet arm 5. The plane of the stopper face 29 is substantially vertical and orthogonal to the first planar surface 26 of the swivel joint 25 which is also substantially vertical. The swivel joint 25 is thus restricted to a rotational range of 90°.

Figure 6:
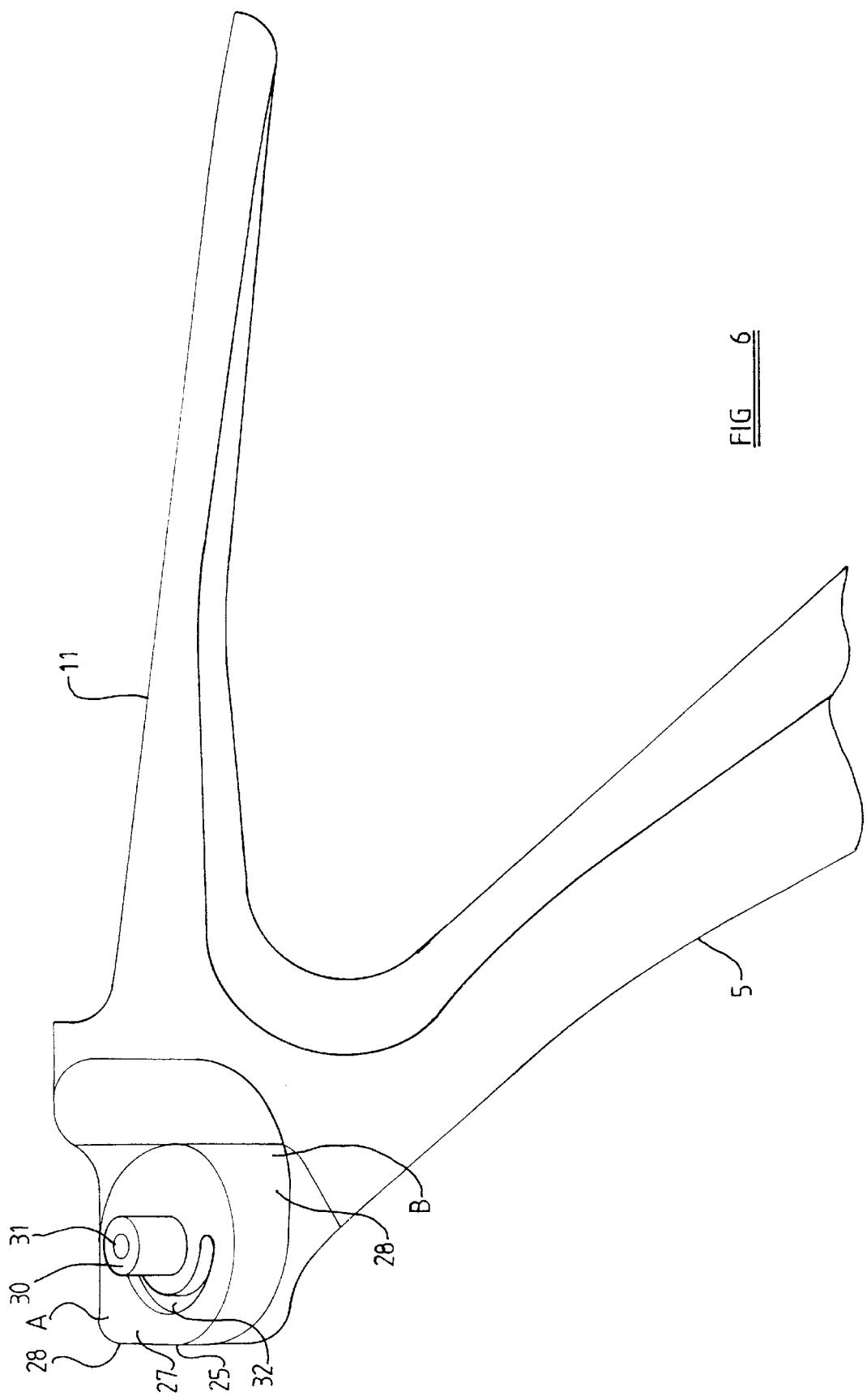
FIG. 6 is a detail of a portion of the frame of the writing tablet assembly fitted with a swivel joint.

The second planar surface 27 of the swivel joint is preferably, as previously mentioned, disposed at 45° to the first planar surface 26. As shown in FIGS. 1 and 6, when the swivel joint 25 is rotated fully anti-clockwise with respect to the tablet arm 5, the second planar surface 27 subtends an angle of 45° with the first planar surface.

A cylindrical stub 30 having a tapped hole 31 therein extends substantially perpendicularly from the centre of the second planar surface 27 of the swivel joint 25 in a similar manner to the stub 24 projecting from the first planar surface 26 of the swivel joint 25. A semi-circular groove 32 defining a 180° arc centred on the centre of the second planar surface 27 is formed in the second planar surface, which groove 32 extends from a position adjacent the narrowest region of the swivel joint to a position adjacent the widest region of the swivel joint 25 as shown in FIGS. 1 and 6.

A second thrust washer 33 is slid over the stub 30, the second 33 washer having a through hole 34 therein which is alignable with the groove 32 in the second planar surface 27 of the swivel joint 25. A swivel plate 35 upon which a writing tablet 36 is mountable is formed with a boss 37 projecting from the swivel plate at an angle of 45° to the main planar axis of the swivel plate 35. The boss 37 is formed with a through bore 38 housing a bearing bush 39 which receives the cylindrical stub 30. A stopper pin 40 is fixed in the boss 37 of the swivel plate 35, passes through the hole 34 in the thrust washer 33 and is located in the semi-circular groove 32 in the second planar surface 27 of the swivel joint 25. The pin 40 sits in the groove 32 and is moveable along the groove. Accordingly, rotational movement of the swivel plate 35 with respect to the swivel joint 25 is restricted to 180°.

The swivel joint 25 is pivotally mounted to the swivel plate 35 by a disk spring 41, a thrust washer 42 and countersunk screw 43 on the side of the boss 37 remote from the swivel joint 25.

The screws 23, 43 in the tapped holes of the two cylindrical stubs 24, 30 of the swivel joint 25 are not tightened to their fullest extent as this would prevent easy rotation of the swivel joint 25 with respect to the swivel plate 35 and the tablet arm 5. The screws are tightened to such a degree that rotation is still possible.

The writing tablet 36 is mounted on the swivel plate 35 by four mounting screws 44 to 47, the screw 43 rotatably mounting the swivel plate 35 to the second planar surface 27 of the swivel joint 25 being seated in a recess 48 in the swivel plate 35 which is thereby only accessible when the writing tablet 36 is removed from the swivel plate 35 (as shown in FIG. 1).

A spacer block 49 is provided on the underside of the swivel plate 35 on the opposite side to that upon which the writing tablet 36 is mounted. The spacer block 49 is fixed to the swivel plate 35 by a screw 50 which also adjusts the amount by which the spacer block 49 projects from the swivel plate 35.

The writing tablet 36 is substantially flat and is manufactured from injection moulded plastics. The underside of the writing tablet 36 is formed with an indented finger hold 51 (FIG. 5) so that the writing tablet 36 may be gripped.

Figure 4:
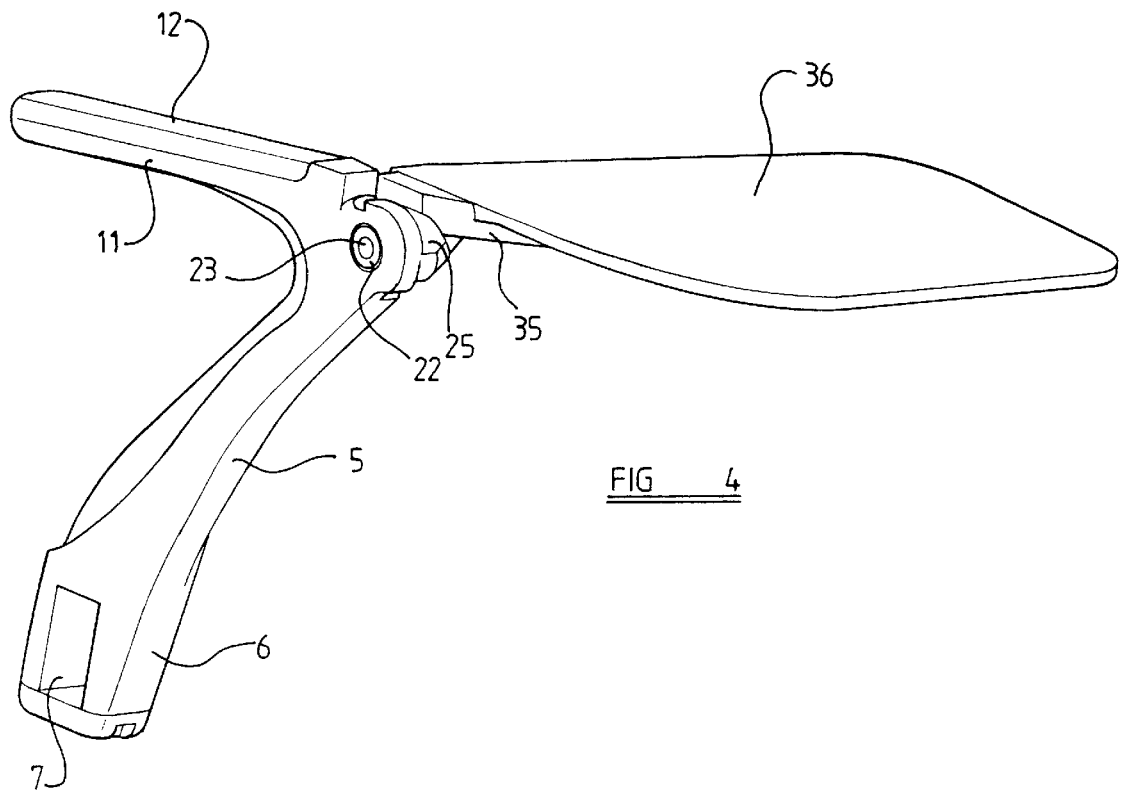
FIG. 4 is a perspective view of the assembled writing tablet assembly of FIG. 1 in a position of use.
Figure 5:
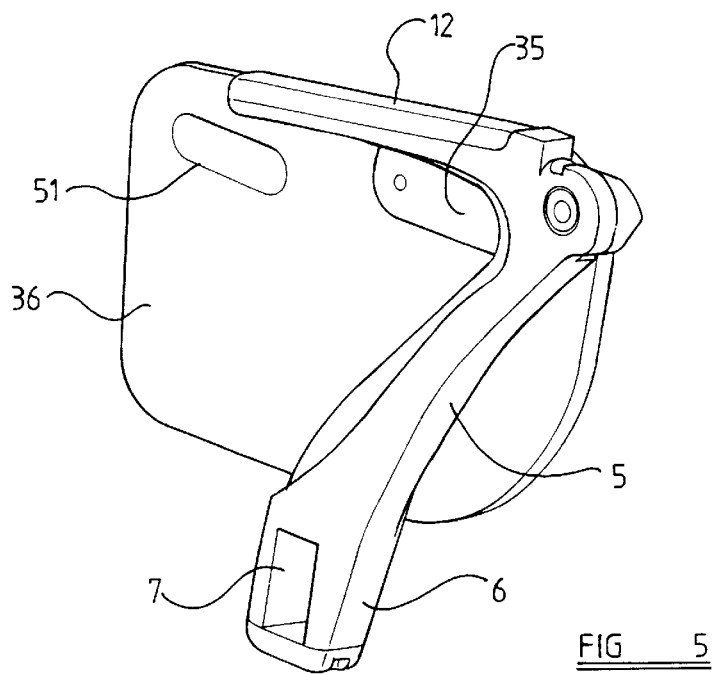
FIG. 5 is a perspective view of the assembled writing tablet assembly of FIG. 1 in a stored position.
Figure 7:
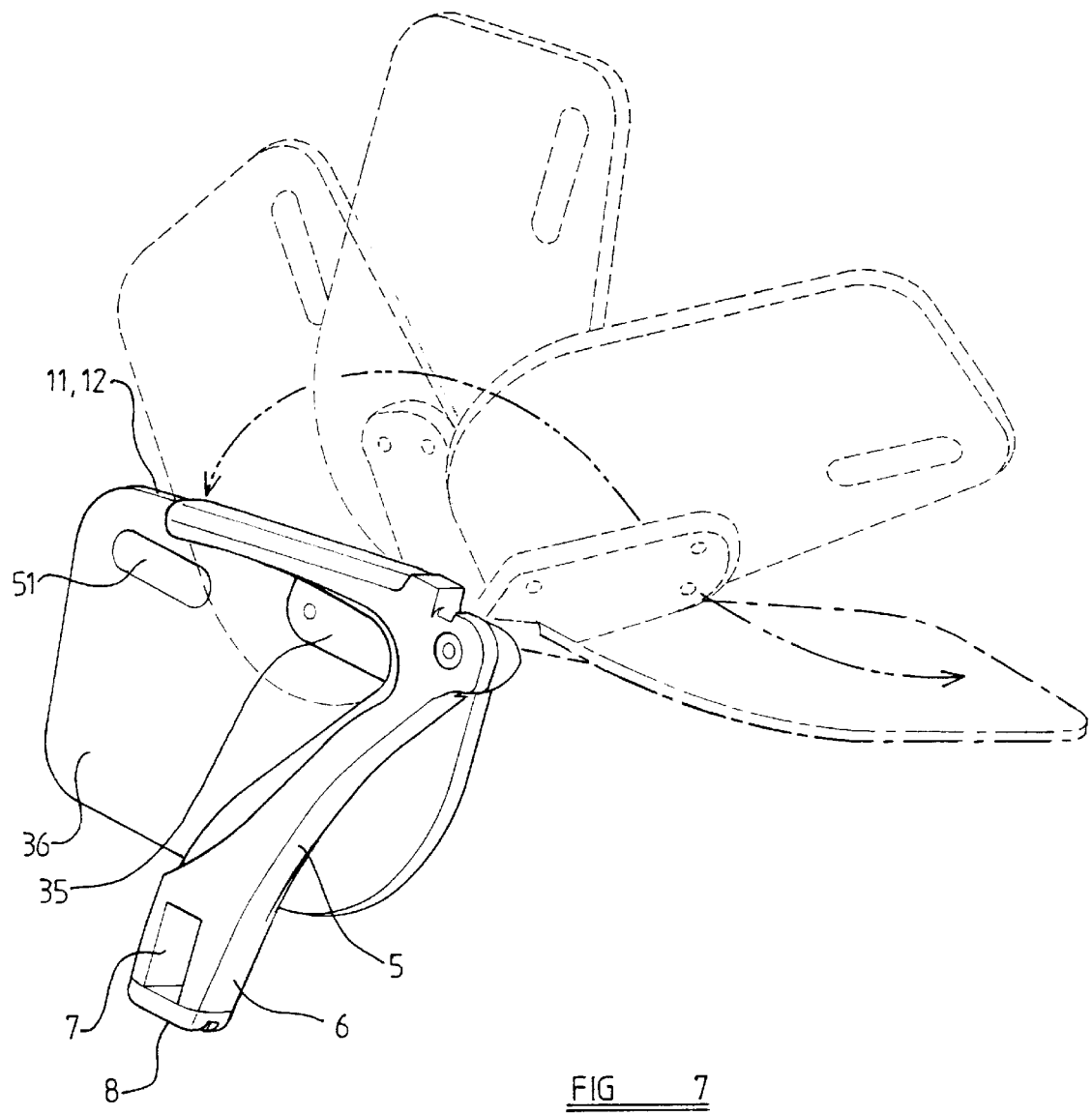
FIG. 7 is a perspective view showing the swing path of the writing tablet of the writing tablet assembly of FIG. 1 with respect to the frame of the writing tablet assembly, the writing tablet being shown at five separate stages during its movement along the swing path.

The writing tablet 36 is designed to be moved from the stored position in which the writing tablet 36 is substantially vertical and adjacent in the present example, the right hand side of the chair 2 as shown in FIG. 5 to the in use position in which the writing tablet 36 is substantially horizontal and in front of a person seated in the chair 2 as shown in FIG. 4. As best seen in FIG. 7, the transition from the stored position to the in use position is effected in one smooth movement. Starting from the stored vertical position shown in FIG. 5, the writing tablet 36 is gripped by the indented finger hold 51 and pulled directly upwards by a person sitting in the chair 2. The writing tablet 36 moves through 90° in the vertical plane by rotation of the swivel joint 25 with respect to the tablet arm 5. All rotation during this stage is in the first plane of the swivel joint 25, ie. the vertical plane. This anti-clockwise movement of the swivel joint 25 with respect to the table arm 5 (as shown in FIG. 6) comes to a stop when the lobe 28 at the widest part of the swivel joint 25 comes into contact with the stopper face 29 on the tablet arm 5.

The next stage of the single movement is effected by rotation of the writing tablet 36 with respect to the swivel joint 25, the swivel joint being prevented from moving with respect to the tablet arm 5 by the lobe 28 abutting the stopper face 29 on the tablet arm 5. At the start of this second stage the tablet arm 5 is in the vertical plane but is rotatable with respect to the swivel joint 25 about a plane 45° to the vertical, which is equivalent to the current plane of second planar surface 27 of the swivel joint 25. Rotation of the writing tablet 36 with respect to the swivel joint 25 results in the writing tablet 36 moving from the vertical position into the horizontal position shown in FIG. 4. During this second stage the writing tablet 36 rotates 180° with respect to the swivel joint 25.

When the writing tablet 36 is in the horizontal position it is prevented from rotating any further by the pin 40 abutting the end of the semi-circular groove 32. The only direction which the writing tablet 36, may now move is back into the vertical plane by counter rotation of the writing tablet 36 through 180° with respect to the swivel joint which movement would be against gravity. Accordingly, the writing tablet 36 is effectively now biased into the position of use.

The movement from the vertical stored position into the of use position and vice versa is very fluid. This single movement takes up less space therefore allowing better access between rows of chairs incorporating writing tablet assemblies embodying the present invention.

I claim:

1. A writing tablet assembly for attachment to a chair (2) comprising: a writing tablet (36) movable between a stored position and an in use position, and vice versa; a frame (1) for supporting the writing tablet (36) and for attachment to the chair (2); and a swivel joint (25) interposed between the writing tablet (36) and the frame (1), the swivel joint having two planar surfaces (26,27) disposed at 45° to one another, the frame (1) abutting the swivel joint (25) at the first surface (26) which defines a first predetermined plane of rotation of the swivel joint (25) with respect to the frame (1) and the writing tablet (36) abutting the swivel joint (25) at the second surface (27) which defines a second predetermined plane of rotation of the writing tablet (36) with respect to the swivel joint (25), the writing tablet being rotatable with respect to the swivel joint through substantially 180°.

2. A writing tablet assembly according to claim 1, wherein stop means are provided to limit the angular extent of rotation of the swivel joint with respect to the frame or the writing tablet in the respective first or second predetermined plane of rotation.

3. A writing tablet assembly according to claim 2, wherein the angular extent of rotation of the swivel joint with respect to the frame in the first predetermined plane of rotation is limited to substantially 90° and the angular extent of rotation of the writing tablet with respect to the swivel joint in the second plane of rotation is limited to substantially 180°.

4. A writing tablet assembly according to claim 3, wherein the stop means comprises a pin and slot arrangement, one of the pin and slot being located on the swivel joint and the other of the pin and slot being located on the frame or the writing tablet to limit rotation of the frame or the writing tablet with respect to the swivel joint.

5. A writing tablet assembly according to claim 3, wherein the stop means comprises an external portion of the swivel joint adapted to abut an external portion of the frame or the writing tablet to limit rotation of the swivel joint with respect to the frame or the writing tablet.

6. A writing tablet assembly according to claim 2, wherein the stop means comprises a pin and slot arrangement, one of the pin and slot being located on the swivel joint and the other of the pin and slot being located on the frame or the writing tablet to limit rotation of the frame or the writing tablet with respect to the swivel joint.

7. A writing tablet assembly according to claim 6, wherein the stop means further comprises an external portion of the swivel joint adapted to abut an external portion of the frame or the writing tablet to limit rotation of the swivel joint with respect to the frame or the writing tablet.

8. A writing tablet assembly according to claim 6, wherein the pin is fixed on a part of the writing tablet and is received in a slot formed on a surface the swivel joint.

9. A writing tablet assembly according to claim 8, wherein the slot is a semi-circular slot limiting rotation of the writing tablet in the second predetermined plane of rotation with respect to the swivel joint to a 180° range.

10. A writing tablet assembly according to claim 9, wherein the stop means further comprises an external portion of the swivel joint adapted to abut an external portion of the frame or the writing tablet to limit rotation of the swivel joint with respect to the frame or the writing tablet.

11. A writing tablet assembly according to claim 8, wherein the stop means further comprises an external portion of the swivel joint adapted to abut an external portion of the frame or the writing tablet to limit rotation of the swivel joint with respect to the frame or the writing tablet.

12. A writing tablet assembly according to claim 2, wherein the stop means comprises an external portion of the swivel joint adapted to abut an external portion of the frame or the writing tablet to limit rotation of the swivel joint with respect to the frame or the writing tablet.

* * * * *